E. J. LEES.
GEAR CUTTING MACHINE.
APPLICATION FILED JAN. 11, 1909.

1,066,509.

Patented July 8, 1913.
7 SHEETS—SHEET 2.

Witnesses:
J. C. Turner
Jno. F. Oberlin

Inventor:
Ernest J. Lees
by J. B. Fay
Attorney

UNITED STATES PATENT OFFICE.

ERNEST J. LEES, OF CLEVELAND, OHIO, ASSIGNOR, BY MESNE ASSIGNMENTS, TO GOULD & EBERHARDT, OF NEWARK, NEW JERSEY, A CORPORATION OF NEW JERSEY.

GEAR-CUTTING MACHINE.

1,066,509.  Specification of Letters Patent.  Patented July 8, 1913.

Application filed January 11, 1909. Serial No. 471,596.

*To all whom it may concern:*

Be it known that I, ERNEST J. LEES, a citizen of the United States, and a resident of Cleveland, county of Cuyahoga, and State of Ohio, have invented a new and useful Improvement in Gear-Cutting Machines, of which the following is a specification, the principle of the invention being herein explained and the best mode in which I have contemplated applying that principle, so as to distinguish it from other inventions.

The present invention relating as indicated to gear cutting machines, has as its object, the provision of a machine of this type that will be adapted for universal service, namely to cut spur, worm, or helical gears as occasion may arise, as also to cut gears, in the case of such helical or worm gears, of any desired pitch, and either fine or coarse.

To the accomplishment of these and related ends, said invention, then, consists of the means hereinafter fully described, and particularly pointed out in the claims.

The annexed drawings and the following description set forth in detail certain mechanism embodying the invention, such disclosed means constituting, however, but one of various mechanical forms in which the principle of the invention may be used.

In said annexed drawings.

Figure 1:
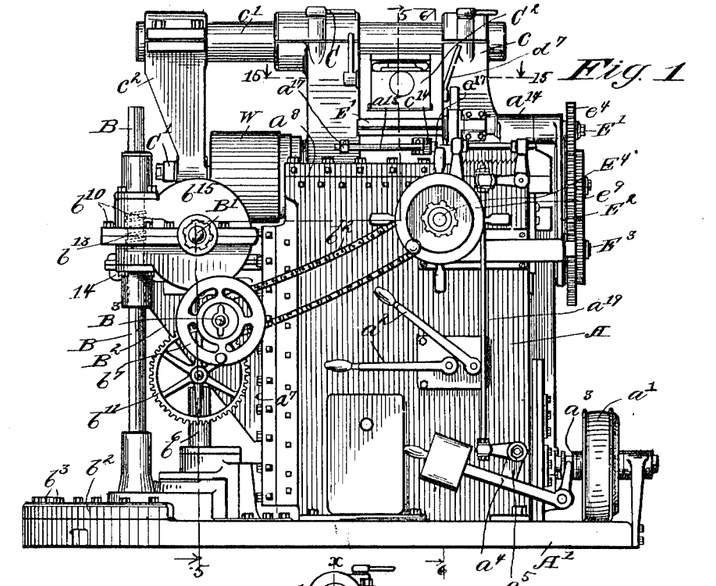
Figure 1 is a side elevational view of a gear-cutting machine, and embodying my several improvements, the side illustrated being the right of the machine as shown in Fig. 2 which is a front elevation of the same.
Figure 2:
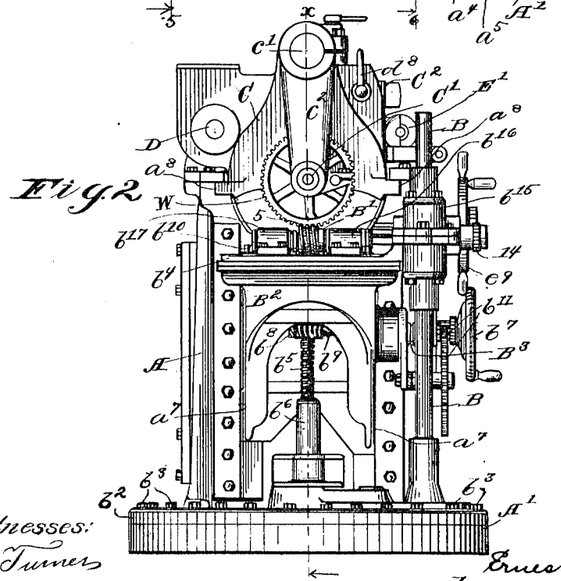
Figure 4:
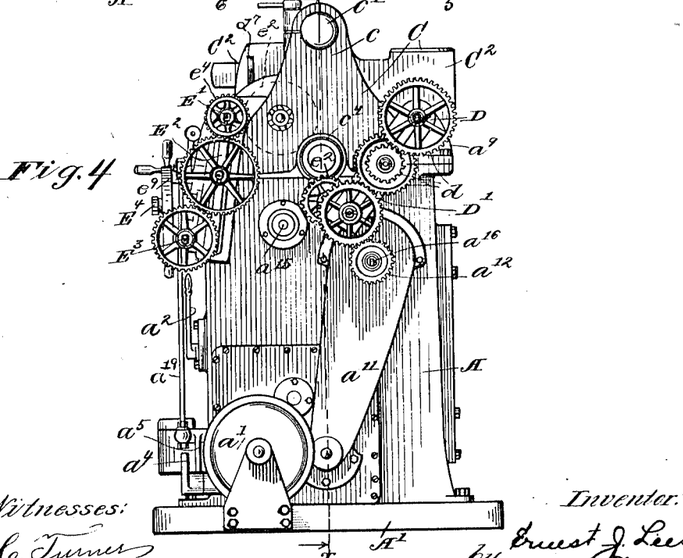
Fig. 4 a rear elevation thereof.
Figure 6:
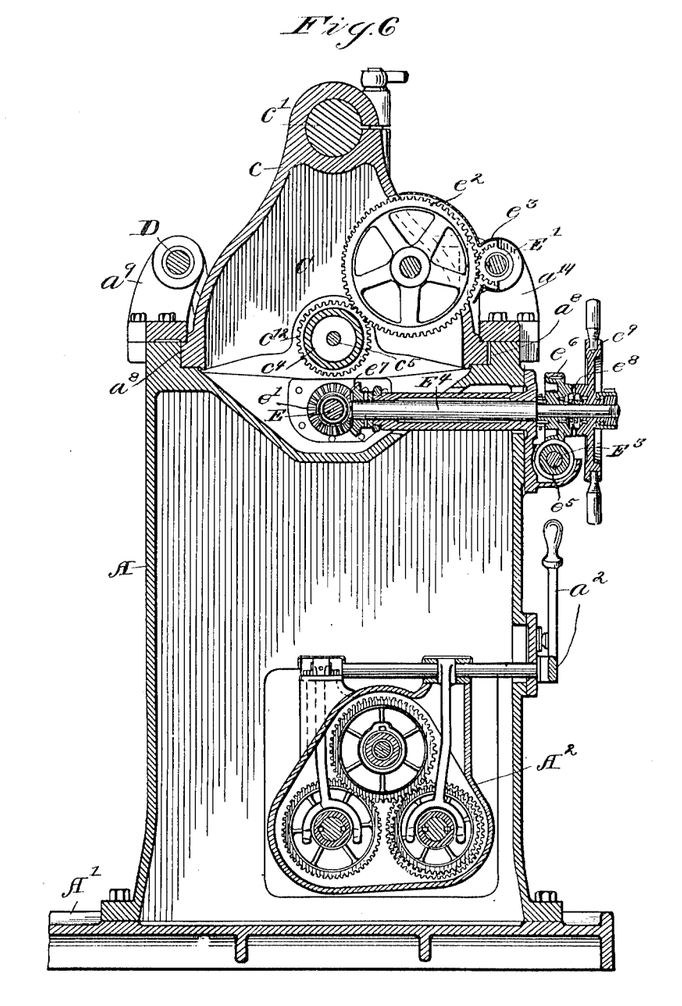
Fig. 6 is a transverse vertical section taken on the line 6—6 Figs. 1 and 3.
Figure 8:
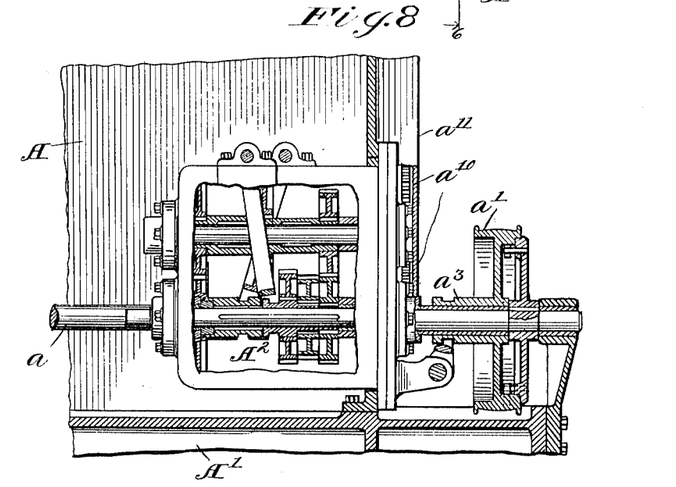

The several mechanisms comprised in the machine are suitably mounted, as will be presently explained, in a general frame work A resting on a bed A'. Extending longitudinally of the latter and suitably journaled in bearings provided therefor in the frame is the main drive shaft $a$ to which motion is communicated from a driving pulley $a'$ through a change speed gear box, $A^2$ permitting the same to be rotated at various rates of speed as occasion may require (Fig. 8). Suitable levers $a^2$ for shifting the gears in such box are provided exteriorly of the machine frame (Figs. 1, 4, and 6). A clutch $a^3$ normally connects such pulley with the shaft, when machine is in operation, but a weighted lever $a^4$ is adapted upon being released from a latch $a^5$ to break such connection and stop the machine. Mechanism for automatically tripping latch $a^5$ will be described later.

Figures 9, 15:
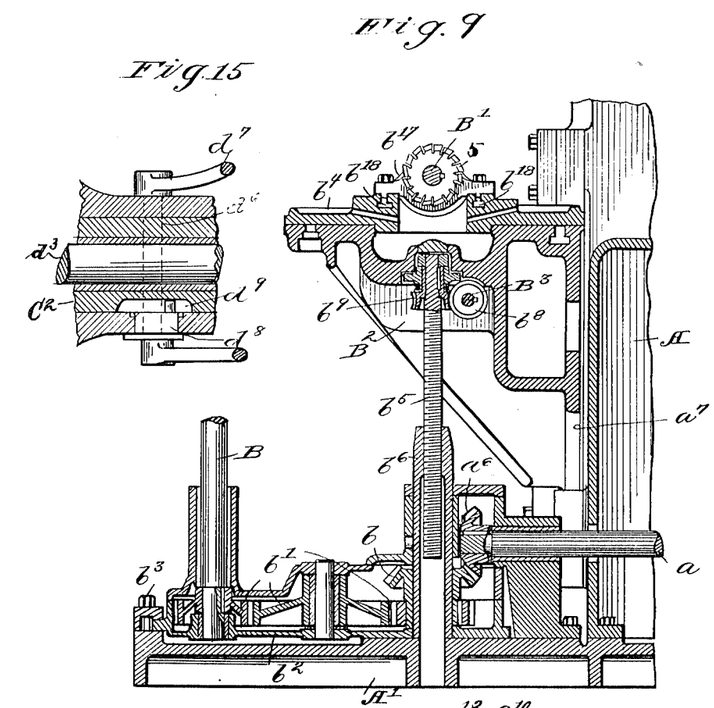
Fig. 15 is a section of a detail of the machine taken on the line 15—15, Fig. 1.

The cutter mechanism, which will be first taken up and described, is designed to be driven directly from pulley $a'$ through change speed gear $A^2$ and main drive shaft $a$, and to this end the latter is provided at its forward end with a beveled gear $a^6$ that meshes with another beveled gear $b$ through which, together with an interposed train of gearing $b'$, motion is communicated to a vertical cutter drive shaft B (Fig. 9). Beveled gear $b$ is rotatable about the same axis as that around which the cutter-spindle B' is adjustable to vary the cutting angle, and the bed-plate $b^2$ on which the train of gearing leading to the cutter drive shaft B is mounted, may also be rotated about such axis, thus enabling the cutter drive shaft to be carried around with the cutter-spindle, as the latter is thus variously positioned. When the proper angle has been given the cutter, and such connecting mechanism, the bed plate $b^2$ and thereby the mechanism is secured in place by tightening nuts $b^3$.

Cutter spindle B' is borne on a table $b^4$ rotatably resting upon a bracket or knee $B^2$ that is vertically adjustable in a slide-way $a^7$ provided in the front end of the machine frame A. A screw $b^5$ rotatably connected at its upper end with the bracket and threaded at its lower end in a tubular standard $b^6$, upon which bevel gear $b$ rotates, serves both to support the bracket, and, upon being rotated in the proper direction, to raise or lower the same. Set bolts $b^{16}$ about the edge of the table $b^4$, are adapted to secure the same rigidly to the bracket once its angular position thereon is determined.

A shaft $B^3$, transversely mounted in the bracket so as to be carried along therewith, is provided at its outer end with a hand-wheel $b^7$ and at its inner end with a worm $b^8$ that meshes with a worm-wheel $b^9$ keyed to the screw, so that by rotating such shaft one way or the other, corresponding rotation of screw to raise or lower the bracket, is secured. The details of construction of the hand-wheel and of the gearing $b^{11}$ shown in connection therewith, need not here be described in detail, constituting, as they do, part of a micrometer attachment that forms the subject matter of United States Letters Patent No. 909,623, dated January 12, 1909. By means of this attachment, such vertical feed of bracket $B^2$ and of the cutter borne thereby may be secured and regulated either manually or automatically as desired, a sprocket chain $b^{12}$ (Fig. 1) connecting a gear on said shaft with a gear on shaft $E^4$ that forms part of the feed mechanism for the blank or work.

Motion from the cutter drive shaft $B$ is communicated to the cutter spindle $B'$ through a worm $b^{13}$ (Fig. 1) keyed on the upper end of said shaft and held in engagement with a worm-wheel $b^{14}$ mounted on the end of the spindle, by being secured in the same casing $b^{15}$ along with the latter. This casing forms a part of the table $b^4$ upon which the cutter-spindle is mounted as has just been described. By virtue of the sliding connection of the worm on the shaft, it will be seen that the latter will be effective to drive the cutter-spindle irrespective of the vertical position of such bracket whereon table $b^4$ is in turn mounted, just as the connection between the main drive shaft $a$ and the lower end of such cutter drive shaft is maintained, irrespective of the angular position of the latter about the vertical axis of the cutter defined by standard $b^6$.

Figure 3:
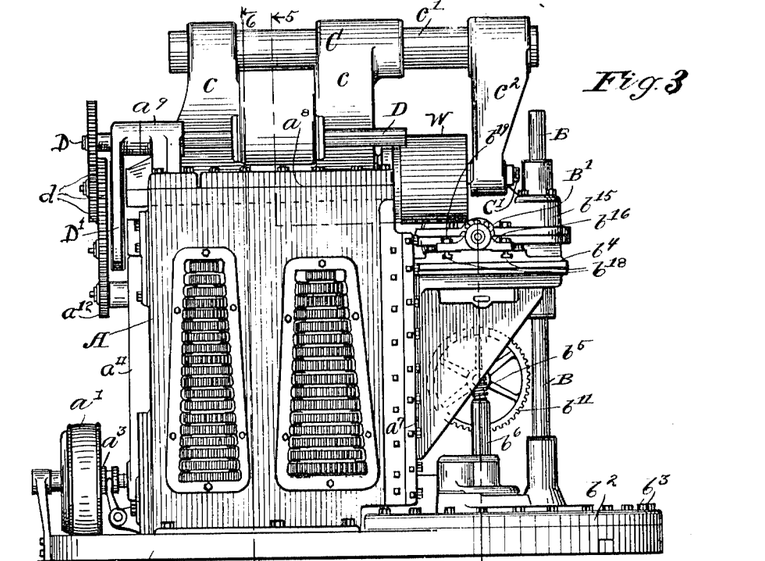
Fig. 3 is a left side elevation of the machine, similarly viewed.
Figure 5:
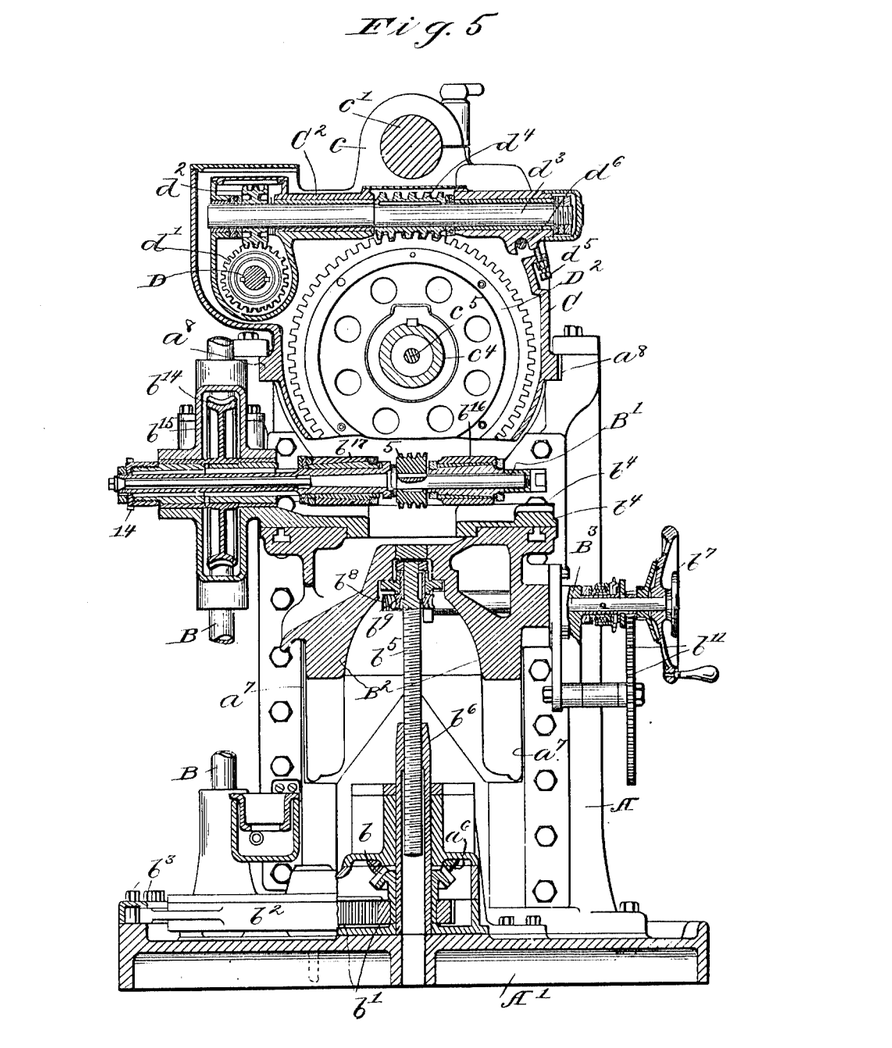
Fig. 5 is a transverse vertical section on the line 5—5 Figs. 1 and 3.
Figure 16:
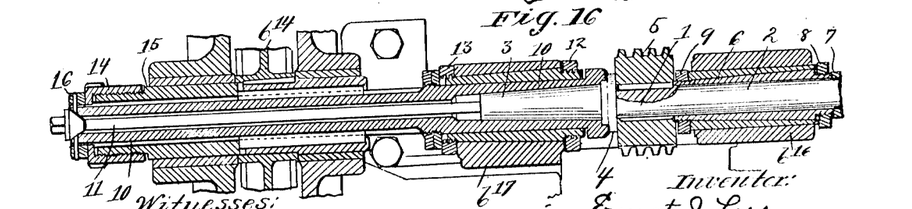
Fig. 16 is a sectional view of the cutter head or table similar to that of Fig. 5, but on a larger scale.

The details of the construction of cutter spindle $B'$, while shown both in Fig. 5 and Fig. 16, will be found illustrative on a larger scale in the latter figure, to which more particular reference is directed in connection with the following description of such details. As there shown, the spindle is in effect made up of an inner solid spindle or arbor 1 comprising a substantially cylindrical portion 2 and a tapering portion 3, such tapering portion being directed toward the end of the spindle upon which is mounted worm wheel $b^{14}$. A collar 4 on the arbor separates such two portions and serves as a stop against which the cutter, shown in the form of a hob 5, may be clamped by means of a sleeve 6 and a nut 7 mounted on the projecting end of the arbor. The cutter is of course keyed onto the latter so as to rotate therewith, while other nuts 8, 9 retain in place the bushing of a bearing block $b^{16}$ on the upper face of table $b^4$. The tapering arbor portion 3 is similarly inclosed in a sleeve 10, that extends beyond such portion for a considerable distance and receives worm wheel $b^{14}$ above referred to. The arbor and sleeve 10 are effectively secured together by means of a draw-in rod 11, and nuts 12, 13, retain in place the bushing of a bearing block $b^{17}$ that is companion to block $b^{16}$. Both bearing blocks are slidably held in transverse ways $b^{18}$ (Fig. 9) in the table so that, by loosening nuts $b^{19}$, they along with the whole spindle may be longitudinally shifted in either direction as may be necessary in order to properly center the cutter with respect to the work. Such longitudinal adjustment is conveniently effected by means of a nut 14 threaded on a sleeve 15 and bearing against a terminal collar 16 on sleeve 10, the sleeve 15 being keyed on the last named sleeve along with gear $b^{14}$, which latter retains it against endwise movement. The blanks W constituting the work are supported in a suitable carriage C mounted upon a horizontal slide way $a^8$ formed in the upper portion of the machine frame. This carriage comprises two vertical standards $c, c$ in which is held, so as to be longitudinally adjustable, a shaft $c'$ of large enough dimensions to insure a rigid support for a pendant arm $c^2$ in which the outer end of the work arbor $C'$ (Fig. 7) is journaled. The blanks are secured in place by such pendant arm, which is adjustable along shaft $c'$ of the slide or carriage proper, as will be readily understood (see Figs. 1 and 3). The portion of the work arbor that is mounted in the body of the carriage comprises two telescoping sleeves $c^3$ $c^4$ both flanged at their forward ends and adapted to be held securely together by means of a draw-in rod $c^5$. The bore of the innermost $c^3$ of said sleeves is tapered to receive the rear end of the arbor $C'$, which loosely but non-rotatably engages the adjacent end of rod $c^5$ in the usual manner.

Figure 7:
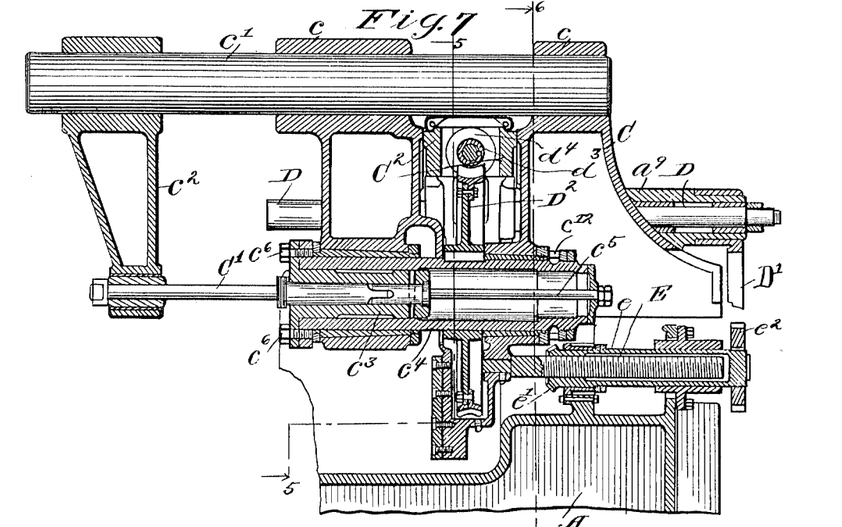
Figs. 7, 8, and 9 are longitudinal vertical sections on a slightly enlarged scale of the several portions of the machine, the plane of the section being indicated by the line $x$—$x$, Figs. 2 and 4.
Figure 12:
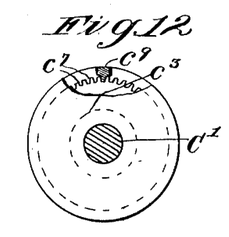
Figs. 12, 13, and 14 are respectively a front elevation, section and detail of a dividing plate designed for use in conjunction with the work-supporting arbor of the machine.
Figure 13:
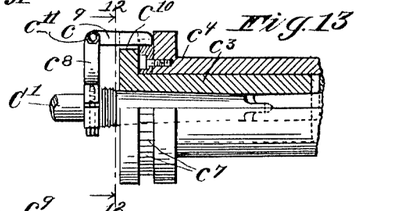
Figure 14:
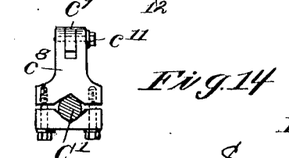

Since it is not infrequently desired in machines of the class in hand, to cut gear with a double, triple or even greater number of threads, I have devised and illustrate in Figs. 12, 13 and 14 a dividing plate adapted to be applied to the arbor $C'$ in order to facilitate the accurate resetting of the work for the cutting of successive threads. Instead, accordingly, of fixedly securing the two flanged ends of sleeves $c^3$ $c^4$ together by means of set bolts $c^6$, as shown in Fig. 7, I introduce a disk between such flanges, which disk is thus secured to the flange of the outer sleeve. This disk is provided with a series of notches $c^7$ equidistantly spaced about its periphery. The number of such notches is conveniently made 60 and they are consecutively numbered or otherwise distinguished. Upon arbor C' immediately in front of the sleeves $c^3$ $c^4$ is clamped an arm $c^8$, in the other end of which is pivotally mounted a dog $c^9$ that when rearwardly disposed is adapted to engage a radial slot $c^{10}$ in the flange of the inner sleeve as also the particular notch $c^7$ in the flange of the other sleeve that is in alinement with such slot. The axial position of the sleeves relatively to each other may be thus obviously varied through any desired angle, the dog being locked in place after the adjustment has been made by tightening the nut $c^{11}$ whereby it is secured to the arm $c^8$. It need scarcely be remarked that such arm is conveniently omitted when cutting ordinary gears, and that it need not necessarily be secured directly to the arbor, but by a slight modification may be attached to the work directly, should this for any reason prove desirable.

Figure 11:
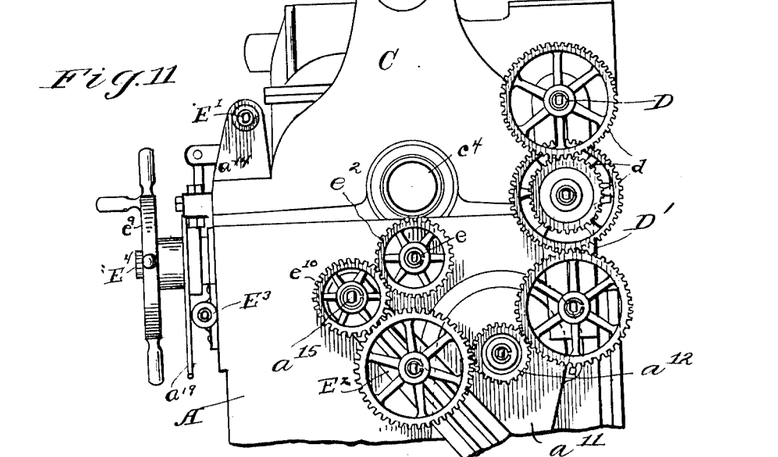
Fig. 11 similarly illustrates yet another arrangement of such gearing.

Attention is next properly directed to the mechanism whereby the work arbor C' is rotated in order to index the work, and then to the mechanism for moving the slide C so as to advance said arbor, and thereby feed the work, across the cutter. For the first-named purpose, that of rotating the work arbor, an indexing drive shaft D is provided, being journaled at its one end so as to be held against longitudinal movement in a standard $a^9$ rising above the machine frame, while its other end is slidably supported in the carriage C. Such indexing shaft is driven from the pulley $a'$ without being subject to the effect of the change speed gear mechanism $A^2$ that is interposed between the pulley and the cutter drive shaft B. To communicate motion from the pulley to the index shaft, a chain of gears $a^{10}$ lying in a casing $a^{11}$ at the end of the machine is provided, through the terminal gear $a^{12}$ of which connection is had with the gears $d$, on a change gear arm D' oscillatorily hung from index shaft D. As will appear later, it is a matter of indifference on which side of gear $a^{12}$ this change gear arm be hung, one position being shown in Fig. 4 and the other in Fig. 11. Slidably mounted upon shaft D, being carried in a housing $C^2$ (Figs. 5 and 7) that is pivotal about such shaft, is a spiral gear $d'$ that meshes with another spiral gear $d^2$ on a transversely disposed shaft $d^3$ carried in the same housing $C^2$. Upon such transverse shaft is mounted in turn a worm $d^4$ that meshes with a large worm-wheel $D^2$ fixed upon sleeve portion $c^4$ of the work arbor. By means of the foregoing connections, it will be evident that rotation or indexing of the work arbor may be secured, irrespective of the position of the carriage C longitudinally of the ways upon which it rests, while such indexing movement may be correlated as desired with the rate of rotation of the cutter by proper adjustment of the speed change gears $d$ through which motion is communicated from the driving pulley to the index shaft D.

The clearance between gear $D^2$ and the longitudinal shaft $c'$ thereabove is sufficient to permit the housing $C^2$, in which shaft $d^3$ is carried, to be raised so as to entirely disengage the worm $d^4$ borne by such shaft from the gear $D^2$ when desired. The normal position of the housing, moreover, in which the worm does thus engage the gear, may be varied by adjusting a set bolt $d^5$ upon which the free end of the housing rests. To lock the housing in place in either of its two positions, a clamp bolt $d^6$ (Figs. 5 and 15) is passed through the portions of carriage C laterally adjacent to the housing, such bolt lying below the forward end of the latter, so that by tightening a handled nut $d^7$ upon the end of the bolt the desired result may be secured. A handled stud $d^8$ rotatably mounted in one such carriage portion, is eccentrically connected with a slot $d^9$ in the housing whereby raising and lowering of the latter are respectively facilitated and controlled.

For feeding the work arbor forwardly so as to advance the blanks carried thereby across the cutter, the latter it being observed having no movement longitudinally of the work, suitable feed mechanism is provided. Such mechanism comprises a feed shaft E (Fig. 5, 6 and 7) fixedly secured at its forward end in the carriage C and threaded intermediately of its ends into a nut $e$ that is rotatably mounted in a suitable bearing in the machine frame A but held against longitudinal movement so that rotation thereof will be effective to advance or retract said shaft, and thereby the carriage. Nut $e$ is in fact a tubular shaft, or sleeve, and is adapted to entirely inclose the shaft in the rearmost position of the carriage, as is the case in the several figures of reference. This sleeve nut bears, integral with its forward end, a bevel gear $e'$, while a spur gear $e^2$ is fixedly mounted on its rear end. Both these gears figure in the connections whereby rotation of the nut may be variously secured as will now be set forth.

As illustrated in Figs. 1 to 9 inclusive, rotation of feed-nut $e$ is secured from a gear $c^{12}$ mounted on the rear end of sleeve portion $c^4$ of the work-arbor. This gear (Fig. 6) drives an idler $e^2$ and thereby a pinion $e^3$, both of which are housed in carriage C and carried along therewith, such pinion being slidably mounted upon a shaft E′ that is journaled at one end so as to be held against longitudinal movement in a standard $a^{14}$, and at the other end slidably supported in the carriage, in much the same fashion as is drive shaft D. Upon the rear end of such shaft E′ (Fig. 4), is mounted a gear $e^4$ and a change gear arm E², through which motion is transmitted from shaft E′ to a back-shaft E³, the forward end of which is provided with a worm $e^5$ that meshes with a worm gear $e^6$ on a transverse shaft E⁴ bearing a beveled gear $e^7$ in mesh with the beveled gear $e′$ on the forward end of the nut $e$ (Fig. 6). Connection of worm gear $e^6$ with the transverse shaft E⁴ is controlled by a clutch, $e^8$, and in the absence of such connection, rotation of the shaft may be manually secured by means of a suitable hand-wheel $e^9$ mounted on its outer end. Upon this transverse shaft E⁴ is also mounted a sprocket-wheel from which the micrometer shaft B³ for the cutter table, or support is driven.

Figure 10:
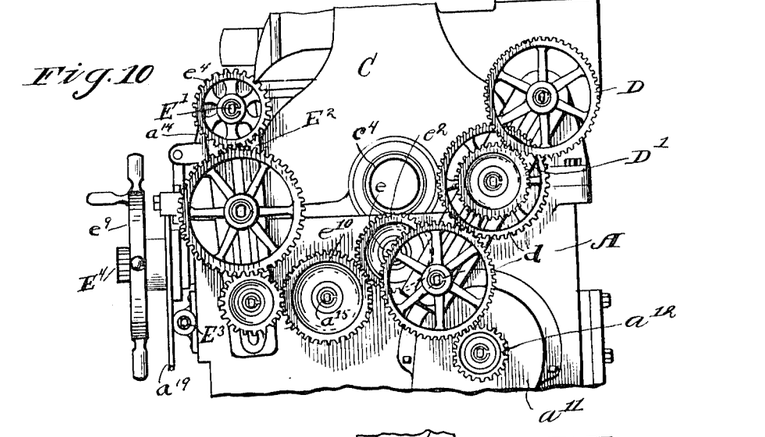
Fig. 10 is a broken rear elevation of the machine showing a change in the gear connections from that illustrated in Fig. 4.

In the arrangement of the gearing illustrated in the rear elevation of the machine shown in Fig. 10, the back-shaft E³ is eliminated along with the transverse shaft, and the power is transmitted directly from shaft E′ to the feed-nut $e$ by swinging the change gear arm E² so as to connect gear $e^4$ with an idler $e^{10}$ mounted on a stud $a^{15}$ and meshing with the spur gear $e^2$ on the rear end of the nut.

In the third arrangement of gearing for driving the feed-nut, rotation thereof is effected directly from the gear $a^{12}$ that forms the terminal of the chain of gears $a^{10}$ extending upwardly within case $a^{11}$ from the driving pulley $a$. To accomplish this, change gear arm E² is removed from shaft E′ and attached to the stud $a^{16}$ upon which such gear $a^{12}$ is mounted, and then communicates motion to the same idler $e^{10}$ employed in the second arrangement, which as before, drives the nut directly by meshing with the gear $e^2$ on the rear end of the latter. In this case change gear arm D′ is conveniently hung on the other side of gear $a^{12}$ from that shown in Fig. 4. It should be remarked in connection with this last described arrangement, that it is obviously a matter of indifference, whether change gear arm D′ is thus connected with gear $a^{12}$ or with idler $e^{10}$ or the gear $e^2$ on the feed-nut, since the effect will be substantially the same, the only advantage possible for either such alternative arrangement being a simplification of the speed reduction, which otherwise has to be secured wholly through the change gear arm.

Reference has been previously made to the trip device $a^5$ for breaking connection between driving pulley $a$ and the several operating mechanisms of the machine by releasing weighted clutch lever $a^4$. Actuation of such trip is secured automatically by the engagement of a lug or ear $c^{14}$ on the side of the carriage (Fig. 1) with stops $a^{17}$ adjustably positioned on a horizontally extending rod $a^{18}$ that is connected to actuate the latch by means of a vertically disposed rod $a^{19}$. This trip simultaneously stops the two rotative movements and the feed movement whether of carriage or table.

Having thus described, with what is thought to be sufficient detail, the construction as well as the individual operation of the several mechanisms constituting the machine, the manner in which these coöperate in the performance of the various functions for which the machine is designed, may be briefly set forth. As has been stated, the machine is adapted to cut worm and helical gears, as well as ordinary spur gears. For cutting worm gears, no longitudinal feed movement of the work is required, but instead, a vertical feed movement of the cutter to advance the latter radially inwardly upon the blank, of which but one can be cut at a time. The mechanism, accordingly, for feeding the carriage forwardly is entirely disconnected in this case, and the micrometer attachment for raising the cutter table put into operation after first adjusting such table about its vertical axis, so as to get the cutter, which will of course be a hob, in proper angular position, to produce a worm wheel of the desired pitch. It should be explained, that in all general reference herein to the cutting tool, the term cutter has been indifferently employed to designate either a simple disk cutter or a hob; it is, however, for use with the latter type of cutter that the machine is more particularly designed.

In the cutting of helical or spur gears, the same general principle of operation that is exemplified in the machine forming the subject matter of my co-pending application Serial No. 335,565, filed September 21, 1906, is employed. In other words, not only are independent means provided for rotating the hob and blank support and for feeding the latter across the hob, but in addition such blank rotating and feeding means each include speed change devices, specifically change gear arms D′ and E², whereby the feed movement, the effective lead of the hob, and the rotation of the blank may be correlated as will now be explained by referring briefly to the operation involved in cutting first an ordinary spur gear, and then in cutting a spiral, or as it is sometimes termed, helical gear. If an ordinary spur gear, that is one having straight teeth is to be cut, the hob, which may have teeth of any desired shape and pitch, is secured upon the table support at such an angle to the axis of the blank to be cut as will compensate for the helical line on which the teeth of the hob lie. Change gear arm D' is then arranged so as to effect as many revolutions of the hob to one revolution of the blank as there are teeth to be cut in the latter. Upon the blank being now fed horizontally, that is, in line parallel with its axis, across the face of the hob, the teeth across the whole width of the blank face will be cut in a direction parallel with the axis of the blank, as is required for spur wheels. In thus cutting spur wheels, the rate of feed of the blank across the hob is adjusted to give the best results, having in view the character of the material constituting the blank, and without any regard to the relation of such feed to the relative rotative movements of the blank and hob. When, however, it is desired to cut spiral teeth upon the blank, while the feed of the blank is in the same direction, the relative rates of rotation of blank and hob are carefully correlated with such feed movement by proper adjustment of the change speed gear arms D', E². This for the reason that to cut spiral teeth, the hob requires to be secured upon its support at an angle to the axis of the blank, greater or less, as the case may be, than the angle of the pitch, by an amount equal to the angle of the teeth to be cut. The hob will accordingly, in its rotation, have to be given an effective lead, either positive or negative, the amount of which lead for each fraction of the rotation will have to correspond, having due regard to the angle of the gear being cut, to the advance of the blank across the hob during the same time. The calculation of the gear connections involved in correlating change gear arms D' E² in the manner described, is rendered relatively simple for the operator, by the use of suitable tables, and stacks of gears of proper dimensions are provided in connection with the machine whereby practically any kind of a helical gear may be cut in the manner just described.

In conclusion I should remark that the machine is adapted to cut not merely ordinary worm gearing but the Hindley worm as well. For the latter, the arrangement of blank and cutter hereinbefore described is reversed; in other words the blank is mounted on cutter spindle B', while the cutter is borne on the arbor C'. The knee or table supporting spindle B' is then fed upwardly but carriage C, bearing the arbor C', is held stationary.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a machine of the character described, the combination of a frame; a carriage movable thereon and provided with a work arbor; a cutter support adjustable toward and from said work arbor; a table on said support angularly adjustable about an axis transverse to said work arbor; a cutter spindle mounted on said table; a drive shaft for said spindle whose axis lies laterally of said cutter support and said shaft being held at one end in said table; a support for the other end of said shaft, said support being angularly adjustable in the same fashion as said table; and driving connections to such other shaft-end adapted to rotate the same irrespective of the angular position of said support and table.

2. In a machine of the character described, the combination of a frame; a carriage movable thereon and provided with a work arbor; a cutter support adjustable toward and from said work arbor; a table on said cutter support angularly adjustable about an axis at right angles to said work arbor; a cutter spindle mounted on said table; a drive shaft for said spindle whose axis lies laterally of said cutter support and said shaft being slidably held at one end in said table; a support for the other end of said shaft angularly adjustable in the same fashion as said table; and driving connections to such other shaft-end adapted to rotate the same irrespective of the angular position of said support and table.

3. In a machine of the character described, the combination of a frame; a blank support overhanging one end of said frame; a cutter support vertically adjustable across such frame end; a table on said cutter support angularly adjustable about a vertical axis and provided with horizontally disposed bearings, a cutter spindle mounted in said bearings; a vertical drive shaft for said spindle whose axis lies laterally of said cutter support and said shaft being slidably held in said table; a similarly angularly adjustable support for the lower end of said shaft; and driving connections to such lower shaft-end adapted to rotate the same irrespective of said shaft's angular position.

4. In a machine of the character described, the combination of a frame; a blank support overhanging one end of said frame, such end being formed with a vertical slide-way; a knee, constituting a cutter support, mounted on such slide-way; a feed screw for supporting said knee at any desired height; a table on said cutter support angularly adjustable about a vertical axis and provided with longitudinally adjustable bearings, a cutter spindle mounted in said bearings; a vertical drive shaft for said spindle whose axis lies laterally of said cutter support and said shaft being slidably held in said table; a similarly angularly adjustable support for the lower end of said shaft; and driving connections to such lower shaft-end adapted to rotate the same irrespective of said shaft's angular position.

5. In a machine of the character described, the combination of a frame; a carriage longitudinally movable thereon and provided with a horizontal work arbor overhanging one end of said frame; a horizontally disposed cutter spindle mounted below said work arbor so as to be adjustable both vertically toward and away from the same and angularly about a vertical axis; means for moving said carriage to advance said work arbor across said cutter spindle; means for indexing said work arbor irrespective of the longitudinal position of said carriage; and driving mechanism for said cutter spindle likewise adapted to rotate the same irrespective of the position thereof, said carriage moving and arbor indexing means each including speed changing devices whereby the feeding and indexing of the work and the effective lead of the cutter may be correlated, substantially as described.

6. In a machine of the character described, the combination of a frame; a carriage longitudinally movable thereon and provided with a horizontal work arbor overhanging one end of said frame; a horizontally disposed cutter spindle mounted below said work support so as to be adjustable both vertically toward and away from the same and angularly about a vertical axis; means for moving said carriage to advance said work arbor across said cutter spindle; means for indexing said work arbor irrespective of the longitudinal position of said carriage; and driving mechanism for said cutter spindle likewise adapted to rotate the same irrespective of the position thereof, said carriage moving and arbor indexing means each including a change gear arm whereby the feeding and indexing of the work and the effective lead of the cutter may be correlated, substantially as described.

Signed by me this 5th day of January, 1909.

ERNEST J. LEES.

Attested by—
CHRISTINE E. ARNS,
JNO. F. OBERLIN.